2 Sheets--Sheet 1.
F. MENZER.
Improvement in Revolving Extension Tables.
No. 125,827. Patented April 16, 1872.
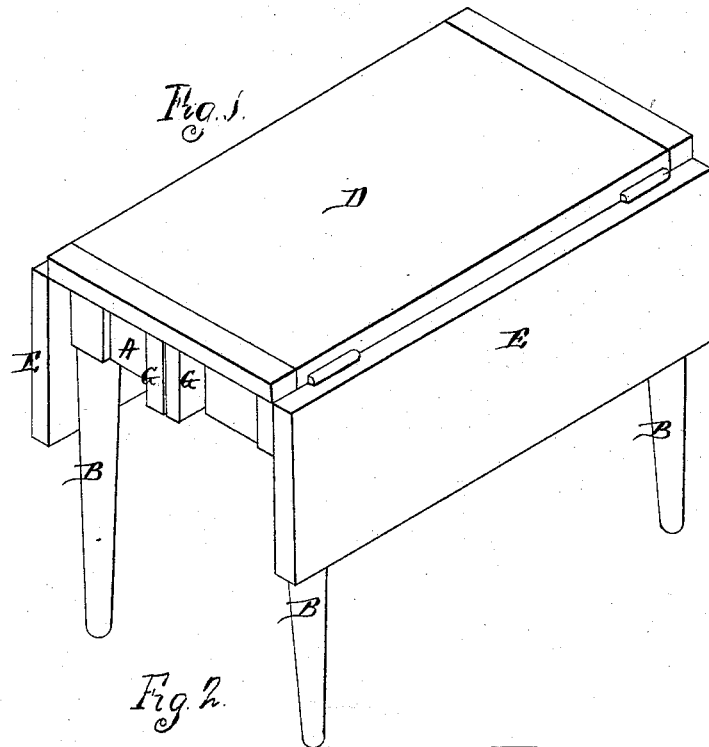
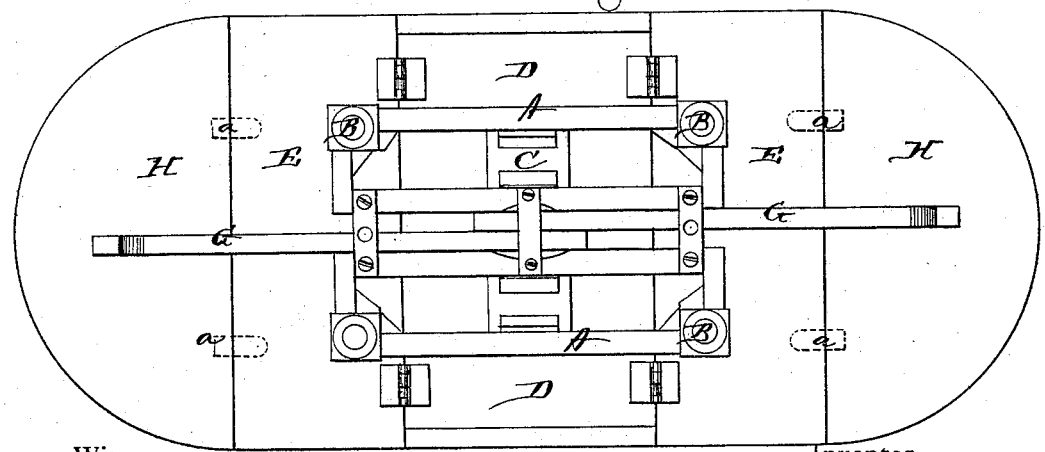
Witnesses:
James E. Hutchinson
Inventor
Fredrick Menzer
per.
Alexander Mason
Attorneys.

2 Sheets--Sheet 2.
F. MENZER.
Improvement in Revolving Extension Tables.
No. 125,827. Patented April 16, 1872.
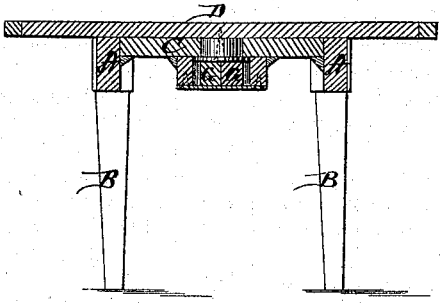
Witnesses:
James E. Hutchinson
Inventor
Fredrick Menzer
per Alexander Mason
Attorneys.

125,827

UNITED STATES PATENT OFFICE.

FREDRICK MENZER, OF FLINT, MICHIGAN, ASSIGNOR OF ONE-HALF OF HIS RIGHT TO GEORGE T. WARREN, OF SAME PLACE.

IMPROVEMENT IN REVOLVING EXTENSION TABLES.

Specification forming part of Letters Patent No. 125,827, dated April 16, 1872.

*To all whom it may concern:*

Be it known that I, FREDRICK MENZER, of Flint, in the county of Genesee and in the State of Michigan, have invented certain new and useful Improvements in Extension Table; and do hereby declare that the following is a full, clear, and exact description thereof, reference being had to the accompanying drawing and to the letters of reference marked thereon making a part of this specification.

The nature of my invention consists in the construction and arrangement of a revolving extension table, as will be hereinafter more fully set forth.

In order to enable others skilled in the art to which my invention appertains to make and use the same, I will now proceed to describe its construction and operation, referring to the annexed drawing, in which—

Figure 1 is a perspective view of my table when folded or closed. Fig. 2 is a bottom view of the same when open. Fig. 3 is a transverse vertical section through the center of Fig. 2, and Fig. 4 is a side view of the slide.

A represents the frame of the table, with a leg, B, at each corner. This frame is provided with a central cross-piece, C, pivoted in any suitable manner, in the center, on the under side of the top D. To each side of the top D is hinged a leaf, E, as shown. G G are two slides in the frame A, which may be drawn out, one at each end of the frame, to support the leaves H H, which are placed one against the outer edge of each of the hinged leaves E E. The leaves H H are provided with pins $a\ a$, which enter holes in the outer edges of the leaves E E.

The table being folded or closed, as represented in Fig. 1, the hinged leaves E E are raised, and they, with the whole top D, swung on the pivot one-quarter of a circle, when the ends of the frame A will support said leaves. The slides G G may then be drawn out and the leaves H H added, which makes a large table.

Having thus fully described my invention, what I claim as new, and desire to secure by Letters Patent, is—

The longitudinally-moving sliding bars G G secured in the frame A, in combination with revolving top D, hinged leaves E E, and detachable leaves H H, all constructed as shown and set forth.

In testimony that I claim the foregoing I have hereunto set my hand this 3d day of February, 1872.

FREDRICK MENZER.

Witnesses:
    CHAS. D. LONG,
    S. HOWARD.